(No Model.) 2 Sheets—Sheet 1.

J. H. BONNER.
COTTON CHOPPER.

No. 589,810. Patented Sept. 14, 1897.

Witnesses
E. St. Monroe
V. B. Hillyard

Inventor
John H. Bonner.
By his Attorneys,
C. A. Snow & Co.

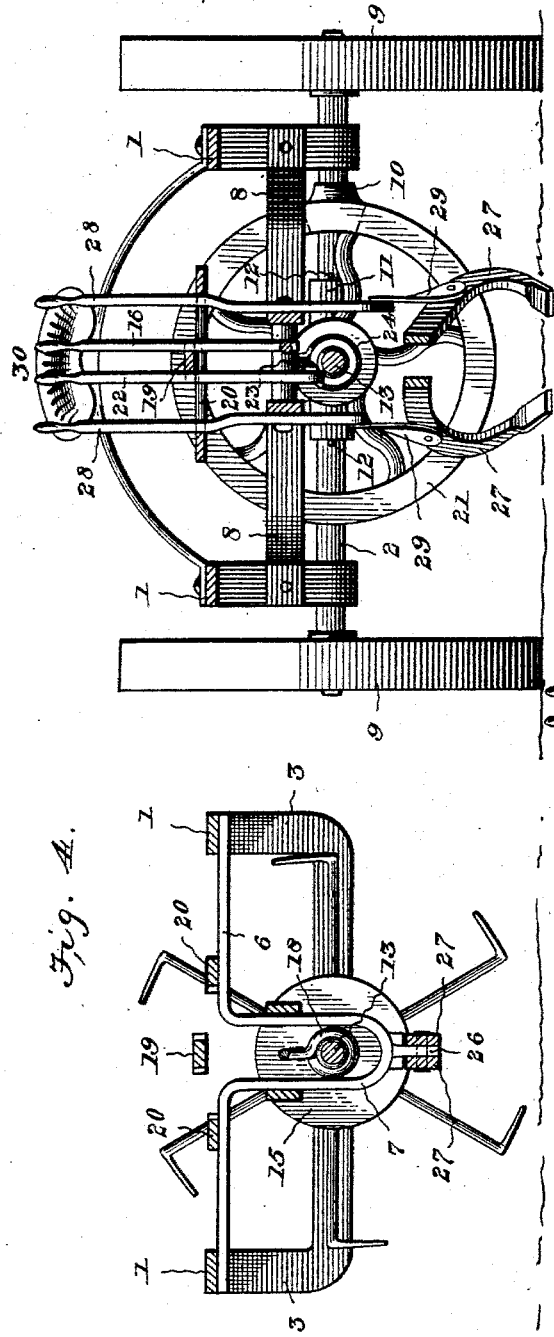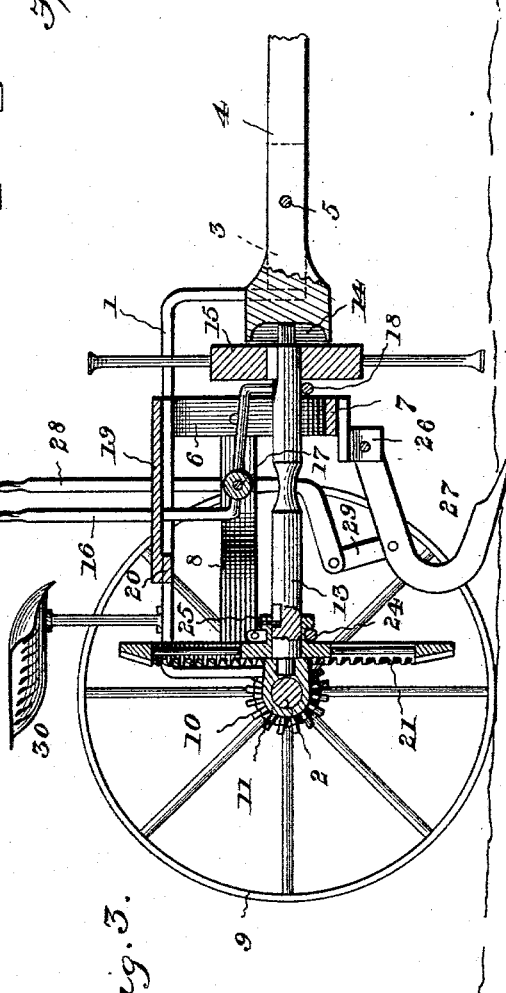

UNITED STATES PATENT OFFICE.

JOHN H. BONNER, OF LOCKPORT, TENNESSEE, ASSIGNOR OF ONE-HALF TO D. W. KING, OF SAME PLACE.

COTTON-CHOPPER.

SPECIFICATION forming part of Letters Patent No. 589,810, dated September 14, 1897.

Application filed June 14, 1897. Serial No. 640,686. (No model.)

*To all whom it may concern:*

Be it known that I, JOHN H. BONNER, a citizen of the United States, residing at Lockport, in the county of Wilson and State of Tennessee, have invented a new and useful Cotton-Chopper, of which the following is a specification.

This invention relates to a combined cotton chopper and scraper, and aims to provide an implement of this character which will admit of the chopping mechanism being raised and lowered at the will of the driver without requiring dismounting or the stopping of the machine and which supplies means whereby the driver can throw the chopping mechanism into or out of gear at any stage of its elevation and enables the scrapers to be adjusted independently according to the condition of the soil and the nature of the surface over which the implement is drawn.

A further purpose of the improvement is to devise a novel formation of framework, mountings, and connections for the operating parts whereby the implement in its general construction occupies a minimum amount of space and enables the least amount of material to enter into its formation consistent with strength and durability essential to the effectiveness and long life of the machine as compared with others for a similar purpose as generally constructed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
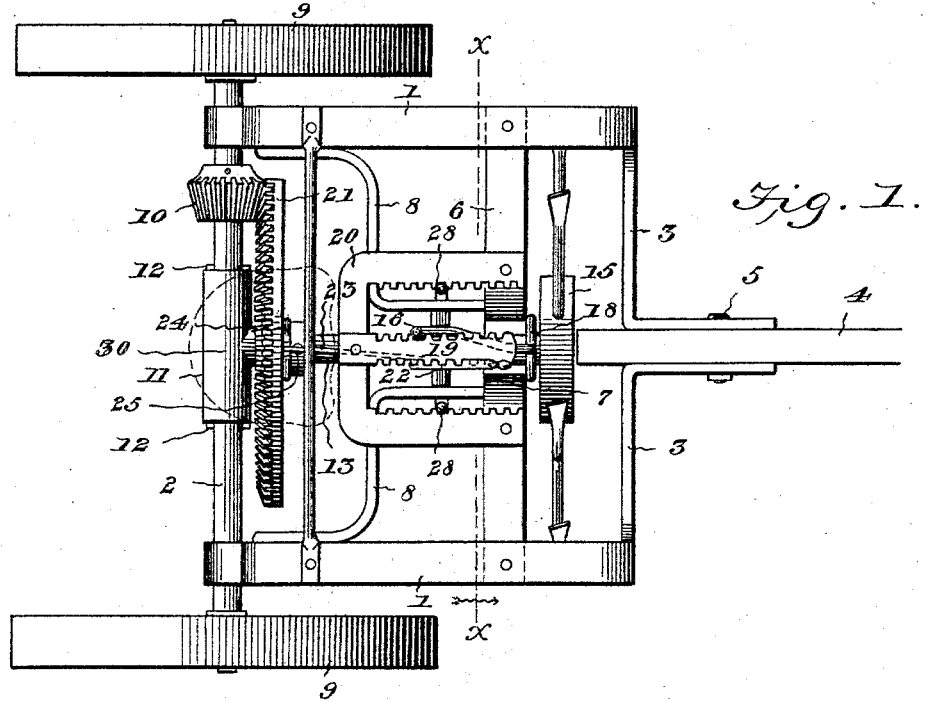
Figure 2:
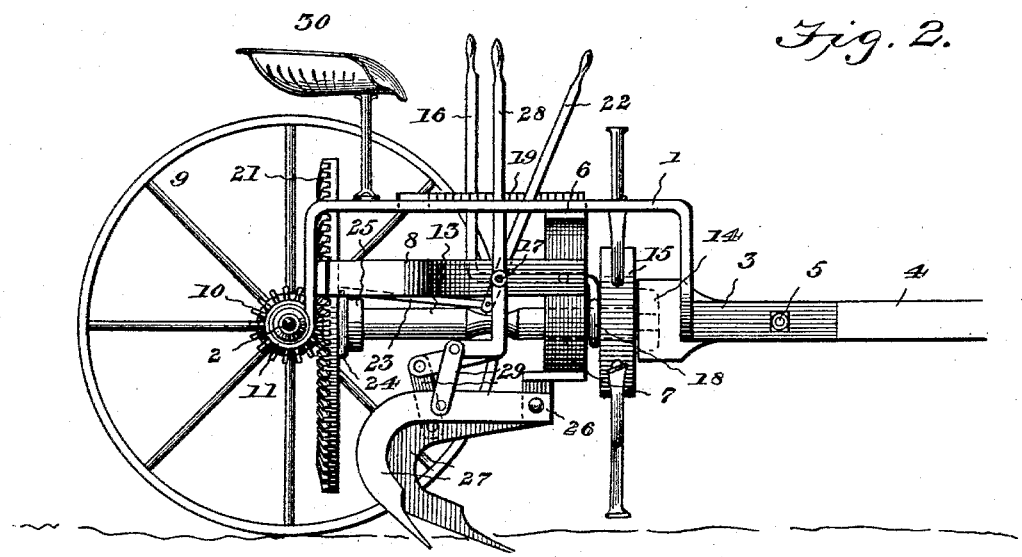

Figure 1 is a top plan view of an implement for carrying into effect the purpose and intent of this invention. Fig. 2 is a side elevation, the near wheel being removed. Fig. 3 is a central longitudinal section, the forward portion of the pole being broken away. Fig. 4 is a transverse section on the line X X of Fig. 1, looking to the front, as indicated by the arrow. Fig. 5 is a transverse section on the same line as Fig. 4, looking to the rear.

Corresponding and like parts are referred to in the following description and indicated in the several views of the accompanying drawings by the same reference-characters.

The framework comprises in its construction side bars 1, having their front and rear ends bent downwardly, the rear ends terminating in bearings in which are journaled the axle 2, front brackets 3, welded or otherwise secured at their outer ends to the bent terminals of the side bars and having their inner ends spaced apart to receive between them the pole or tongue 4, mounted upon a pivot or bolt 5, connecting the inner parallel ends of the brackets 3, an intermediate bar 6, having a pendent loop 7 midway of its ends, and rear brackets 8, secured at their outer rear extremities to the rear bent ends of the side bars and having their inner front ends joined to the side members of the pendent loop 7. The axle 2 is provided at its ends with ground-wheels 9, secured thereto, so as to revolve therewith, and a pinion 10 is secured to an end portion of the axle to rotate therewith for imparting motion to the chopping-wheel.

A sleeve 11 is mounted loosely upon the axle 2 to admit of the latter turning freely, and this sleeve is prevented from endwise movement on the axle by being held between stops or pins 12, applied to the axle and secured thereto in any convenient way. A longitudinal shaft 13 is journaled at its rear end in the sleeve 11, and its front end enters a vertically-disposed slot 14 in the inner or rear end of the pole or tongue, so as to admit of the front end of the shaft being raised and lowered to regulate the elevation of the chopping-wheel 15 secured thereon. The front portion of the shaft 13 passes through the pendent loop 7, which latter in conjunction with the pole or tongue prevents lateral displacement thereof and maintains the chopping-wheel in position against lateral movement. An elbow-lever 16 is fulcrumed upon a pin or rod 17, passing through openings in the front ends of the rear brackets 8, and the front portion of its horizontal arm has a pendent eye 18, which embraces the front end of the shaft 13, so as to move the latter vertically when operating the lever 16, and the latter has a limited lateral movement to admit of its vertical arm or member being engaged with or disengaged from any one of the series of notches formed in one edge of a bar 19, secured at its rear end to a U-shaped frame 20, fastened to the intermediate bar 6 upon opposite sides of the pendent loop 7. The notched bar 19 provides a means for securing the lever 16 in an adjusted position and holding the chopping-wheel at the required elevation.

A gear-wheel 21 is slidably mounted on the rear portion of the shaft 13 and is held thereto by a feather-and-spline connection or in any convenient way, so as to turn with the shaft 13 and admit of its movement thereon, so as to be thrown into and out of engagement with the pinion 10, whereby the chopping mechanism is thrown into and out of gear. A lever 22 is fulcrumed upon the pin or rod 17 and has connection at its lower end with the gear-wheel by means of a rod 23 and a ring 24, the latter receiving the front end of the hub portion of the gear-wheel 21 and held thereon by a lateral extension 25. The lever 22 has a limited lateral movement and is adapted to engage with one of a series of notches formed along the opposite edge of the bar 19, so as to hold the gear-wheel 21 in the required position.

A hanger 26 is secured to the lower end of the pendent loop 7, and similarly-formed scrapers 27 have pivotal connection therewith and are capable of vertical adjustment by means of levers 28, fulcrumed upon the pin or rod 17, and links 29, connecting the lower bent ends of the levers 28 with the standards of the scrapers 27, said levers being held in an adjusted position by engaging with the inner notched edges of the longitudinal members of the U-shaped frame 20. The standards of the scrapers are curved longitudinally and diverge at their rear ends and are provided at their lower extremities with shovel-blades of desired form fitted thereto in any of the usual ways.

It will be observed that the various levers 28, 22, and 16 are disposed in a group and are readily accessible from the driver's seat 30, which is secured to an arched bar 31, connecting the side bars near their rear ends, and by having a separate lever for each scraper, for the shaft 13, and for the gear-wheel 21 these individual parts may be independently operated to secure the required adjustment, which can be effected without necessitating the dismounting of the driver or stopping of the machine.

Having thus described the invention, what is claimed as new is—

1. In a cotton-chopper, the combination of a sleeve loosely mounted upon the axle, a pole or tongue having pivotal connection with the frame and having a vertical slot in its inner or rear end, a longitudinally-disposed shaft bearing a chopping-wheel having its rear end journaled in the aforesaid sleeve and its front end let into the vertical slot of the pole, means for imparting a rotary movement to the shaft for operating the chopping-wheel, and means for raising and lowering the front end of the said shaft and holding it in an adjusted position, whereby the elevation of the chopping-wheel may be regulated, substantially as set forth.

2. In a cotton-chopper, the combination of a sleeve loosely mounted upon the axle, a pole or tongue having a vertical slot in its rear end, a transverse bar having a pendent loop, a longitudinal shaft having its rear end journaled in the aforesaid sleeve and its front end passing through the pendent loop and entering the slot of the pole, and bearing a chopping-wheel, actuating mechanism for the shaft, and means for raising and lowering the front end of the shaft and holding it in an adjusted position, substantially as set forth.

3. In a cotton-chopper, the combination of an axle provided with a pinion, a sleeve loosely mounted upon the axle, a pole having a vertical slot in its rear end, a longitudinal shaft bearing a chopping-wheel and having its rear end journaled in the said sleeve and its front end entering the slotted end of the pole, a gear-wheel slidably mounted upon the shaft to turn therewith, and independent means for raising and lowering the front end of the shaft and for throwing the gear-wheel into and out of mesh with the pinion, whereby the chopping mechanism may have its elevation regulated and be thrown into and out of gear at will, substantially as specified.

4. In a cotton-chopper, the combination of a longitudinal shaft bearing a chopping-wheel, a transverse bar having a pendent loop in which operates the longitudinal shaft, an approximately U-shaped frame having the inner edges of its side members notched and their front ends secured to the transverse bar upon opposite sides of the pendent loop, scrapers having pivotal connection with the pendent loop, and levers having connection with the scrapers for adjusting them and adapted to coöperate with the notched members of the U-shaped frame for holding the scrapers in an adjusted position, substantially as specified.

5. In a combined cotton scraper and chopper, the combination of a longitudinally-disposed shaft bearing a chopping-wheel, a transverse bar having a pendent loop in which operates the longitudinal shaft, an approximately U-shaped frame connected with the transverse bar upon opposite sides of the pendent loop and having the inner edges of its side members notched, a notched bar secured to the closed end of the U-shaped frame, adjustable scrapers, a series of levers mounted upon a common fulcrum and operatively connected with the working parts for raising and lowering the scrapers, changing the elevation of the chopping-wheel, and throwing the latter into and out of gear, and actuating mechanism for the longitudinal shaft, substantially as set forth.

In testimony that I claim the foregoing as my own I have hereto affixed my signature in the presence of two witnesses.

JOHN H. BONNER.

Witnesses:
    D. G. BROWN,
    JAMES T. MILLER.